United States Patent
Oseev et al.

(10) Patent No.: US 12,461,072 B2
(45) Date of Patent: Nov. 4, 2025

(54) ACOUSTIC BIOSENSOR ASSAY ASSEMBLY

(71) Applicant: UNIVERSITE DE FRANCHE COMTE, Besancon (FR)

(72) Inventors: Aleksandr Oseev, Besancon (FR); Thérèse Leblois, Besancon (FR)

(73) Assignee: UNIVERSITE DE FRANCHE COMTE, Besancon (FR)

( * ) Notice: Subject to any disclaimer, the term of this patent is extended or adjusted under 35 U.S.C. 154(b) by 344 days.

(21) Appl. No.: 18/255,900

(22) PCT Filed: Oct. 18, 2021

(86) PCT No.: PCT/EP2021/078820
§ 371 (c)(1),
(2) Date: Jun. 5, 2023

(87) PCT Pub. No.: WO2022/128208
PCT Pub. Date: Jun. 23, 2022

(65) Prior Publication Data
US 2024/0027404 A1    Jan. 25, 2024

(30) Foreign Application Priority Data
Dec. 18, 2020    (EP) .................... 20306611

(51) Int. Cl.
*G01N 29/24*    (2006.01)
*G01N 29/02*    (2006.01)

(52) U.S. Cl.
CPC ....... *G01N 29/2443* (2013.01); *G01N 29/022* (2013.01); *G01N 2291/0255* (2013.01); *G01N 2291/0426* (2013.01)

(58) Field of Classification Search
CPC ............. G01N 29/2443; G01N 29/022; G01N 2291/0255; G01N 2291/0426;
(Continued)

(56) References Cited

U.S. PATENT DOCUMENTS

| | | |
|---|---|---|
| 2004/0185592 A1 | 9/2004 | Bergaud et al. |
| 2008/0199974 A1 | 8/2008 | Frey et al. |

(Continued)

FOREIGN PATENT DOCUMENTS

| | | | | |
|---|---|---|---|---|
| EP | 2017612 A1 | 1/2009 | | |
| EP | 3733310 A1 * | 11/2020 | ........... | B06B 1/0692 |

(Continued)

OTHER PUBLICATIONS

International Search Report issued on Jan. 4, 2022, in corresponding International Patent Application No. PCT/EP2021/078820, 4 pages.
(Continued)

*Primary Examiner* — Francis C Gray
(74) *Attorney, Agent, or Firm* — Maier & Maier, PLLC

(57) ABSTRACT

A biosensor assembly includes a plurality of biosensor units which are juxtaposed next to one another. Respective portions of a continuous piezoelectric monocrystal layer are dedicated to the biosensor units, and Bragg solid bulk structures are arranged on the piezoelectric layer between the portions thereof that pertain to neighboring biosensor units. Each Bragg structure has a pattern repetition direction that is parallel to the piezoelectric layer, and is designed for confinement of elastic vibrations and suppressing cross-talk between the biosensor units. The biosensor assembly can be manufactured from a piezoelectric wafer with low cost price.

15 Claims, 2 Drawing Sheets

(58) Field of Classification Search
CPC .... G01N 29/2437; G01N 29/32; G01N 29/34; G01N 2291/106; G01N 29/036; G01N 2291/0256; H10N 30/082; H10N 30/302; H10N 30/072; H10N 30/706
See application file for complete search history.

(56) References Cited

U.S. PATENT DOCUMENTS

| | | | |
|---|---|---|---|
| 2017/0052174 A1 | 2/2017 | Branch et al. | |
| 2018/0045681 A1 | 2/2018 | Mohapatra et al. | |
| 2018/0143167 A1 | 5/2018 | Mziray et al. | |
| 2019/0250176 A1* | 8/2019 | Bell | G01N 30/96 |
| 2020/0011834 A1* | 1/2020 | Webster | G01N 29/036 |
| 2022/0347687 A1* | 11/2022 | Duan | H03H 9/15 |
| 2023/0219086 A1* | 7/2023 | Duan | B01L 3/502707 |
| | | | 422/527 |

FOREIGN PATENT DOCUMENTS

| | | |
|---|---|---|
| FR | 2823998 A1 | 10/2002 |
| FR | 2976673 A1 | 12/2012 |
| WO | 2005106478 A1 | 11/2005 |
| WO | 2012123749 A1 | 9/2012 |
| WO | 2014143954 A2 | 9/2014 |
| WO | 2018053514 A1 | 3/2018 |
| WO | 2019010275 A1 | 1/2019 |
| WO | WO-2020222639 A1 * | 11/2020 ........... B06B 1/0692 |

OTHER PUBLICATIONS

Tuantranont, et al., "A review of monolithic multichannel quartz crystal microbalance: A review", Dec. 14, 2010, vol. 687, No. 2, pp. 114-128, XP028132503, 15 pages.

Chen, et al., "Isolation of bulk acoustic waves in a sensor array with phononic crystals", Ultrasonics Symposium (IUS), 2011 IEEE International, IEEE ,Oct. 18, 2011, p. 2487-2490, XP032230601, 4 pages.

Lu, et al., "Finite element modeling and analysis of multi-channel quartz crystal microbalance", Proceedings of IEEE Sensors 2003 (IEEE Cat. No. 03CH37498) IEEE Piscataway, NJ, USA; [IEEE International Conference on Sensors], IEEE , vol. CONF. 2, Oct. 22, 2003, p. 888-892vol. 2, XP010691036, 5 pages.

* cited by examiner

ACOUSTIC BIOSENSOR ASSAY ASSEMBLY

FIELD

The invention relates to an acoustic biosensor assay assembly and a method for manufacturing the same.

BACKGROUND

Acoustic biosensors are well-known for detecting whether identified biological compounds are contained or not in liquid samples to be tested. Each biosensor comprises a layer of piezoelectric material which supports two electrodes designed for generating an acoustic vibration within the piezoelectric layer when an alternating voltage is applied between both electrodes. The biosensor then behaves as a resonator. In particular, it has a resonance frequency which can be measured accurately. When biointerfaces capable of fixing the identified biological compounds selectively with respect to other compounds are grafted on an exposed surface of the piezoelectric layer, a change in the resonance frequency occurs upon contacting this exposed surface with the liquid sample if this latter contains an amount of the identified biological compounds. But such operation requires that the quality factor of the acoustic resonator which is formed by the biosensor is large enough for obtaining a high sensitivity to low concentrations of the biological compounds in the sample. Then, an issue when designing acoustic biosensors is to increase their values of quality factor.

Another issue consists of multiplexing of sensors on a single chip.

Still another issue is manufacturing such acoustic biosensors at low cost with reduced sizes. Indeed, the number of biological tests which are carried out nowadays is very important, and several biological compounds are requested most of time to be searched for in each sample. Because of these other issues, there are interests in using collective processes for manufacturing several acoustic biosensors simultaneously, and for combining several biosensor units within one assembly so that one sample can be contacted simultaneously with all the biosensor units of one assembly. In this way, time is saved when testing one sample for several biological compounds, and a small amount of each sample can be sufficient even for multiple-compound tests. Collective manufacturing processes include for example material deposition processes, etching processes, polishing processes, etc. For these reasons, biosensor assemblies have been proposed in which the monocrystalline piezoelectric layer is obtained by depositing a piezoelectric material onto a substrate and then heating it for causing the piezoelectric material to crystallize. But the piezoelectric layers that are obtained in this way are of poor crystal quality, such that only limited crystal orientation can be obtained Furthermore, two types of acoustic biosensors are SAW and BAW biosensors, as disclosed in document WO 2019/010275 for example, SAW standing for Surface Acoustic Wave and BAW for Bulk Acoustic Wave.

A main objective of the present invention is to provide an assembly of multiple high quality factor BAW biosensors on a same chip, preferably comprising an assay.

Another objective is to perform label-free measurements.

Another objective is to perform the measurements in real-time.

Another objective of the invention consists in providing such biosensor assemblies with low cost price.

Still another objective of the invention consists in providing such biosensor assemblies that are of reduced size, and suitable for testing small sample amounts.

SUMMARY

For meeting at least one of these objectives or others, a first aspect of the present invention proposes a biosensor assembly that comprises a plurality of biosensor units which are juxtaposed next to one another parallel to a reference plane. Each of the biosensor units has a respective piezoelectric portion and at least one electrode that is dedicated to applying a voltage to this piezoelectric portion separately from the other biosensor units, so that each biosensor unit is capable of performing measurements independently from the other biosensor units, based on acoustic vibrations that are generated by the voltage within the piezoelectric portion of this biosensor unit. In this way, the voltage which is applied to each of the respective piezoelectric portions of the biosensor units allows that the biosensor units perform their respective measurements simultaneously or not.

Each biosensor unit is further provided with a biointerface which is arranged for fixing a biological compound from a sample to be tested using at least this biosensor unit.

According to a first feature of the invention, the piezoelectric portions of at least several ones of the biosensor units are formed by one common layer of a piezoelectric monocrystal that extends continuously between these piezoelectric portions, parallel to the reference plane. In this manner, all piezoelectric portions can be supplied as a single piece, which can be mounted in a single step during the manufacturing of the biosensor assembly. Low cost price can be achieved in this way.

According to a second feature of the invention, the biosensor assembly further comprises Bragg solid bulk structures that are supported rigidly by the piezoelectric monocrystal layer and have pattern repetition directions which are in the reference plane. These Bragg solid bulk structures are distributed on the piezoelectric monocrystal layer so that, for any pair of biosensor units that are next to one another in the assembly, at least one of the Bragg solid bulk structures is located between both biosensor units of the pair and has at least one pattern repetition direction that is oriented from the piezoelectric portion of one of the biosensor units of the pair towards the piezoelectric portion of the other biosensor unit of the same pair.

Thanks to the piezoelectric portions being formed by the layer of piezoelectric monocrystal, and these portions being isolated from each other by the Bragg solid bulk structures, high values for the quality factor of the resonators can be achieved, and very low or no crosstalk occurs between neighboring biosensor units. In addition, the Bragg solid bulk structures minimize or suppress part of vibration energy that might sink from the piezoelectric portions of the biosensor units into anchoring parts used for supporting the piezoelectric layer.

Preferably, the Bragg solid bulk structures may be further distributed on the piezoelectric monocrystal layer so that each of the piezoelectric portions that is dedicated to one of the biosensor units is surrounded by one or several of the Bragg solid bulk structures. Possibly, Bragg solid bulk structures which may be implemented in the invention may each have an annular design so that it can be arranged around one of the piezoelectric portions.

In particular, the Bragg solid bulk structures may be of a material that is different from the piezoelectric monocrystal.

In the present description, a Bragg solid bulk structure is intended to mean a solid pattern which is repeated periodically and formed from material portions that are each solid and self-supporting independently from being supported by the piezoelectric monocrystal layer. Such Bragg solid bulk structures are opposed to well-known Bragg surface structures.

Optionally, in most preferred implementations of the invention, one or several ones of the following additional features may be reproduced:

- the biosensor assembly may be designed so that the voltage that is applied to the piezoelectric portion of each biosensor unit, is applied between two opposite faces of the layer of piezoelectric monocrystal. In this way, each biosensor unit can be of BAW-type;
- each Bragg solid bulk structure that is next to a limit of the piezoelectric portion dedicated to one of the biosensor units may have its pattern repetition direction that crosses this limit. Even more preferably, the pattern repetition direction may be oriented perpendicular to the limit of the piezoelectric portion;
- each Bragg solid bulk structure may be formed by a spatial alternation between at least two media having respective acoustic impedance values that are different from one another. Possibly, one of these media may be a gas, in particular air;
- each Bragg solid bulk structure may be formed by a one-dimensional, two-dimensional or three-dimensional repetition of a pattern;
- each Bragg solid bulk structure may be comprised of a network of separated pillars, separated walls or separated wells, with an extension direction of these pillars, walls or wells, respectively, that is perpendicular to the reference plane;
- a pitch of each Bragg solid bulk structure may be comprised between one tenth and one hundredth of a lateral dimension of the piezoelectric portions that are next to this Bragg solid bulk structure, when this lateral dimension is measured parallel to the reference plane;
- a pitch of each Bragg solid bulk structure may be comprised between one third and twice a thickness of the piezoelectric material layer, when this thickness is measured perpendicular to the reference plane;
- each piezoelectric portion that is dedicated to one of the biosensor units of the assembly, as delimited by the Bragg solid bulk structures, may have a square shape, disk shape, or any other regular or irregular shape;
- the piezoelectric monocrystal layer may be a quartz layer, in particular an AT-cut, ST-cut, Y-cut, Z-cut or 36° Y-cut quartz layer, or a lithium niobate layer, in particular a 128° Y-cut or 64° Y-cut lithium niobate layer, or a lithium tantalate layer, in particular a 112° Y-cut or 64° Y-cut lithium tantalate layer, or any other piezoelectric monocrystalline material and cuts; and
- at least part of the Bragg solid bulk structures is out of silicon, or any other solid material.

A second aspect of the invention proposes a method for manufacturing a biosensor assembly that is in accordance with the first aspect, this method comprising the following steps:

/1/ providing a first wafer of a piezoelectric monocrystal material and a second wafer of a solid material;
/2/ adhering the first wafer to the second wafer, the first and second wafers being then both parallel to the reference plane;
/3/ determining a thickness of the first wafer, for example by polishing this first wafer on a side thereof that is opposite the second wafer;
/4/ forming the electrodes on the first wafer, on the side thereof that is opposite the second wafer;
/5/ etching the second wafer on a side thereof that is opposite the first wafer, so as to remove selectively portions of the second wafer in zones of the reference plane, thus forming the Bragg solid bulk structures; and
/6/ optionally, grafting biointerfaces on the first wafer, on portions thereof that are dedicated to different ones of the biosensor units, as these portions are delimited by the Bragg solid bulk structures, on the side of the first wafer that is opposite the second wafer, each biointerface being suitable for fixing identified biological compounds selectively with respect to other compounds.

Possibly, step /2/ may comprise depositing an intermediate layer of an adhesion material onto the first and/or second wafer(s), and applying the first and second wafers against one another with the intermediate layer therebetween. In such implementations, the adhesion material may advantageously be electrically conducting, so as to possibly form a reference electrode common to all the biosensor units. In particular, the adhesion material may be gold.

Again possibly, the first wafer may be thinned in step /3/ down to a thickness value that is comprised between 1 μm (micrometer) and 2 mm (millimeter), when measured perpendicular to the reference plane.

In step /5/, areas of the first wafer that are delimited by the Bragg solid bulk structures constitute the piezoelectric portions that are dedicated respectively to the biosensor units. Possibly, the second wafer may be etched on its side opposite the first wafer for removing its solid material in the areas that correspond to the piezoelectric portions dedicated to the biosensor units, simultaneously to forming the Bragg solid bulk structures.

These and other features of the invention will be now described with reference to the appended figures, which relate to preferred but not-limiting embodiments of the invention.

BRIEF DESCRIPTION OF THE DRAWINGS

For clarity sake, element sizes which appear in these figures do not correspond to actual dimensions or dimension ratios. Also, same reference numbers which are indicated in different ones of these figures denote identical elements of elements with identical function.

DETAILED DESCRIPTION OF THE INVENTION

Figure 1:
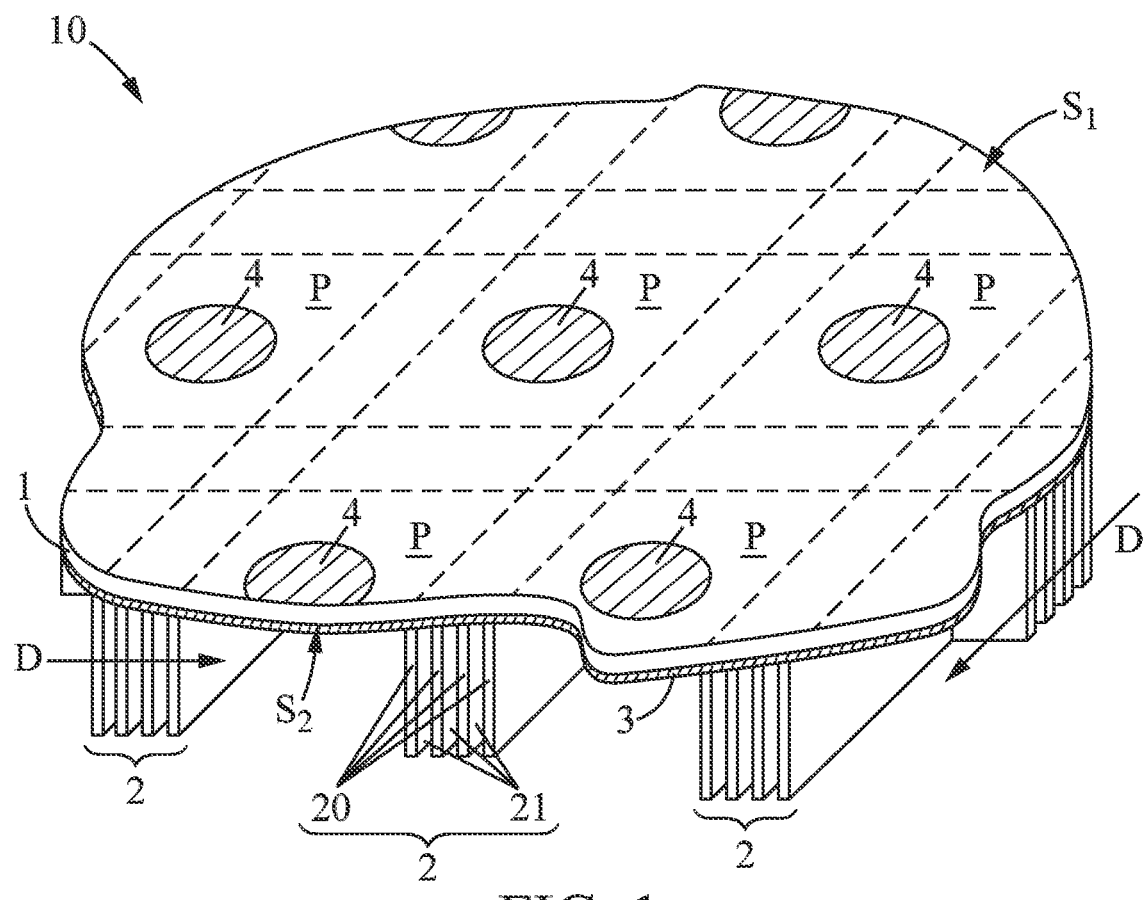
FIG. 1 is a perspective view of a biosensor assembly according to the invention.

In FIG. 1, reference number 10 denotes generally the biosensor assembly. It comprises a layer 1 of a piezoelectric monocrystal, for example a AT-cut quartz layer. The layer 1 may have thickness up to one millimeter or more. The in-plane dimensions of the layer 1 may be from less than one millimeter to several centimeters. The layer 1 has an upper surface denoted $S_1$ and a lower surface $S_2$ which are opposed to each other and parallel. When using the biosensor assembly 10 for performing measurements, the upper surface $S_1$ is intended to be in contact with a sample to be tested. For example, when the sample is liquid, the sample may be brought into contact with the surface $S_1$ through an appropriate delivery circuit (not represented). Alternatively, an amount of the liquid sample may be deposited by an operator on the surface $S_1$. The surface $S_1$ may constitute the reference plane which is mentioned in the general part of the present description.

The lower surface $S_2$ of the piezoelectric monocrystal layer 1 may be covered with a continuous layer 3 of an electrically conducting material, for example gold. The thickness of the layer 3 may be in the range of 10 nm (nanometer) to 500 nm or more.

A set of Bragg solid bulk structures 2 is affixed to the layer 3 on a side thereof that is opposite the piezoelectric monocrystal layer 1. These Bragg structures 2 are distributed parallel to the surface $S_2$ so as define areas which are devoid of Bragg structures but are each surrounded by some of the Bragg structures. In this way, the piezoelectric monocrystal layer 1 is divided into a plurality of piezoelectric portions P parallel to its surfaces $S_1$ and $S_2$, each portion P being dedicated to one biosensor unit. Each portion P is further provided with a respective electrode 4 on the upper surface $S_1$ of the layer 1. When using one of the biosensor units, an alternating excitation voltage is applied between the electrode 4 of this biosensor unit and the layer 3 which is common to all biosensor units. Tracks on the surface $S_1$ suitable for connecting the electrodes 4 to respective voltage sources have not been represented in FIG. 1, but they are shown with reference 4T in FIGS. 2c-2e. The alternating voltage that is applied to one of the electrodes 4 with respect to the electrode 3 generates an acoustic vibration in the corresponding portion P, and a response signal which can be collected through the electrode 4, for example an electrical intensity value, is representative for a vibration amplitude of the layer 1 within the portion P. Then, the biosensor unit exhibits a resonance, with a resonance magnitude and/or frequency which varies as a function of an amount of a biological compound that is fixed on the upper surface $S_1$ of the layer 1 in the corresponding portion P. For obtaining a biosensor unit that is sensitive selectively to one identified biological compound, a biointerface 5 (see FIG. 2e) has been grafted on the upper surface $S_1$ in the portion P that corresponds to this biosensor. This biointerface 5 fixes selectively the molecules of the biological compound to be detected in the sample. Such operation of an acoustic biosensor is well-known, so that no further description is necessary here. One can report to any published document relating to this topic.

Portions P of the layer 1 that are apart from one another are intended to form different biosensor units with their respective electrodes 4 and biointerfaces 5. These biosensor units can be used for performing measurements independently from one another, but preferably simultaneously for saving measurement time. Then, it is an issue that no crosstalk or no significant crosstalk occurs between biosensor units that have neighbouring portions P. The function of the Bragg solid bulk structures 2 is thus to reduce or suppress such crosstalk so that each portion P of the piezoelectric layer 1 form a separate isolated vibration cavity. To this end, each Bragg structure 2 is formed by at least one solid pattern which is repeated parallel to the surface $S_2$. Possibly, the width of each pattern of the Bragg structures 2 may be of the order of the thickness of the layer 1. Two repetitions of the pattern to more than ten may be used within each Bragg structure 2, these repetitions being implemented along at least one direction that is parallel to the surface $S_2$. In FIG. 1, D denotes such pattern repetition directions of the Bragg structures 2. In the embodiment shown in FIG. 1, the pattern is comprised of a wall 20 which extends perpendicular to the surface $S_2$, and a separating gap 21. Each Bragg structure 2 comprises several walls 20, for example four walls 20, parallel to each other when projected onto the surface $S_2$. The so-formed Bragg structures 2 surround each portion P, preferably with respective longitudinal directions of the walls that are parallel to the peripheral limits of the neighbouring portions P. The Man skilled in the art knows which thickness values are to be provided to the walls 20 and separating gaps 21 for obtaining a high reflection value for each Bragg structure 2 with respect to acoustic waves that propagate within each portion P of the layer 1.

In alternative embodiments of the Bragg structures 2, other patterns may be implemented, including pillars or wells extending perpendicular to the surface $S_2$ and repeated along two directions parallel to this surface $S_2$. Such pillars or wells are located between neighbouring portions P spaced apart from one another, and form an in-plane two-dimensional network.

Possibly, the solid portions that constitute the Bragg structures may be varied in material composition along a direction perpendicular to the surface $S_2$. In this way, three-dimensional networks can be designed for forming the Bragg structures 2.

The Bragg structures 2 are thus each comprised of a one-dimensional, two-dimensional or three-dimensional alternation of at least two media, at least one of them being solid, with respective acoustic impedance values which are different from each other. For example, the walls 20 may be out of silicon, and be separated with air gaps. Possibly, the wall-separating gaps 21 may be filled with another material which has an acoustic impedance value different from that of silicon. Any solid material may also be used instead of silicon.

The shapes of the portions P as delimited by the Bragg structures 2 in the surface $S_2$ may be any, including squares, disks, hexagons, irregular shapes with any side numbers, for example irregular pentagons, etc.

A method for manufacturing a biosensor assembly similar to that of FIG. 1 is now described with reference to FIGS. 2a-2e.

Figure 2A:
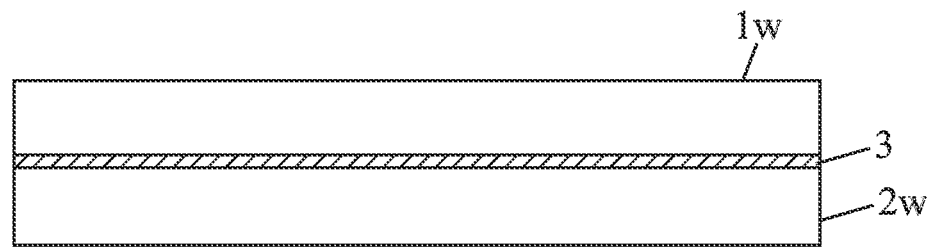
FIGS. 2a to 2e are cross-sectional views which illustrate steps of a method for manufacturing a biosensor assembly according to the invention.

The method starts with providing a wafer of piezoelectric monocrystal 1w, referred to as first wafer in the general part of the present description, and a second wafer 2w of a solid material, referred to as second wafer. Both wafers 1w and 2w may be between two inches to six inches in diameter or of different sizes. The wafer 1w may be a AT-cut quartz wafer, and the wafer 2w may be a silicon wafer. The gold layer 3 is deposited on one face of the wafer 1w, or one face of the wafer 2w, or on a respective face of both wafers 1w and 2w. Any deposition process known in the art may be implemented for forming the gold layer 3, including sputtering, electron beam or thermal evaporation. Both wafers 1w and 2w are then pressed against each other with the gold layer 3 therebetween. When a force in the range from 0.01 kN (kilonewton) to 10 kN or different is applied, the gold layer 3 makes both wafers 1w and 2w to adhere, so that a hybrid large-area support is obtained as shown in FIG. 2a.

Figure 2B:
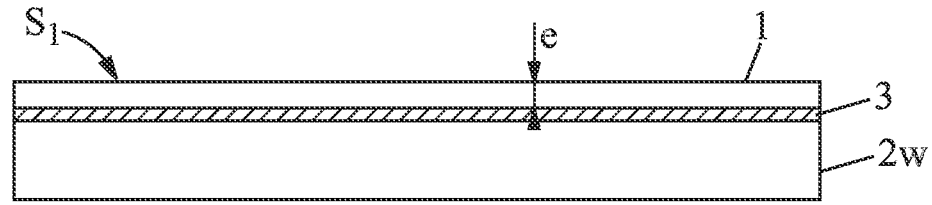

This hybrid support may be then polished on the quartz side so as to reduce the quartz thickness down to a final value, as shown in FIG. 2b. This final quartz thickness, denoted e, may be several micrometers, for example. The layer 1 is thus obtained from the wafer 1w. In case the wafer 1w initially has the final thickness value e, the quartz polishing step may be omitted. The exposed face of the layer 1 forms the surface $S_1$ which has been mentioned earlier.

Figure 2C:
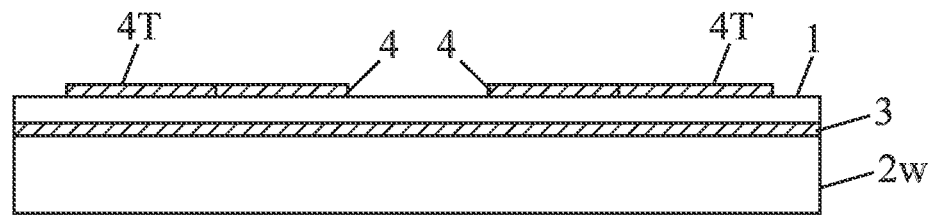

In a next manufacturing step shown in FIG. 2c, the electrodes 4 are deposited on the surface $S_1$ of the layer 1, in the portions P thereof that are intended to form the separated resonators of the biosensor units. The electrodes 4 may be formed using any suitable material and deposition process. For example, a continuous electrically conducting layer may be deposited by sputtering gold or ITO material on the surface $S_1$ of the quartz layer 1, and then parts of this conducting layer are removed for obtaining the separated electrodes 4. Tracks 4T for connecting the electrodes 4 may be formed simultaneously on the surface $S_1$. Removal processes such as wet or dry etching processes, lift-off, etc. may be used for defining the electrodes 4 and tracks 4T. The electrodes 4 may be from 50 nm to more than 1 µm in thickness.

Figure 2D:
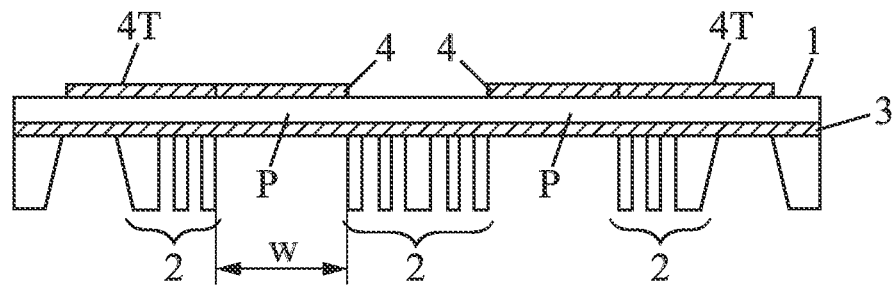

The step shown in FIG. 2d consists in forming the Bragg solid bulk structures 2. To this end, the wafer 2w may be etched using a deep reactive ion etching process, or a wet etching process, through an appropriate mask. Preferably, etching is continued until the gold layer 3 is reached. The wafer 2w may be etched simultaneously for forming the Bragg structures 2 and for removing the material of the wafer 2w in the areas that correspond to the portions P of the layer 1. The final filling factor of the remaining material of the wafer 2w within the Bragg structures 2 may be between 0.01 and 0.99, zero-value corresponding to the absence of walls and unity corresponding to non-etched material. The width w of each portion P thus defined may be from 0.1 mm to several millimeters or more, and is larger or equal to the size of the electrode 4 that is supported by this portion P, when measured parallel to the surfaces $S_1$ and $S_2$. Possibly, the gaps 21 that have been etched within each Bragg structure 2 may be filled with another material which has a value of acoustic impedance different from that of silicon. Optionally, parts of the wafer 2w may also be kept from being etched for forming handling portions of the biosensor assembly 10 and/or supporting portions for attachment to a base (not represented).

Figure 2E:
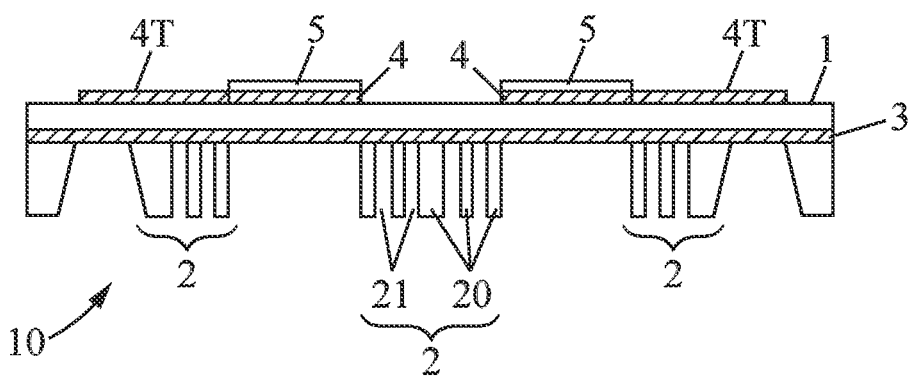

Finally, a biointerface 5 is grafted on the surface $S_1$ within each portion P, as shown in FIG. 2e, for fixing an identified biological compound and allowing the corresponding biosensor unit to measure an amount of this compound that is contained in a sample to be tested. Possibly, the grafting is performed on the corresponding electrode 4. Such grafting may be performed by a user of the biosensor assembly, depending on the biological compounds that he will search for in the samples to be tested. Different ones of the biosensor units in one same assembly 10 may advantageously be grafted with different biointerfaces 5, relating to different identified biological compounds.

The invention may be reproduced while changing or adapting some aspects of the detailed description which has been just provided. In particular, all numeral values have been provided for illustrative purpose only, and may be varied in a great extent. The material of the piezoelectric layer may also be changed, provided that it can be obtained as a monocrystal layer with side dimensions that are large enough with respect to the number of biosensor units that are to be combined within one and same biosensor assembly.

The invention claimed is:

1. A biosensor assembly comprising a plurality of biosensor units which are juxtaposed next to one another parallel to a reference plane, each of the biosensor units having a respective piezoelectric portion and at least one electrode that is dedicated to applying a voltage to said piezoelectric portion separately from the other biosensor units, so that said biosensor unit is capable of performing measurements independently from the other biosensor units based on acoustic vibrations that are generated by the voltage within the piezoelectric portion of said biosensor unit, each biosensor unit being further provided with a biointerface arranged for fixing a biological compound from a sample to be tested using at least said biosensor unit, wherein the piezoelectric portions of at least several ones of the biosensor units are formed by one common layer of a piezoelectric monocrystal that extends continuously between said piezoelectric portions, parallel to the reference plane, and wherein the biosensor assembly further comprises Bragg solid bulk structures that are supported rigidly by the piezoelectric monocrystal layer and have pattern repetition directions which are in the reference plane, and the Bragg solid bulk structures are distributed on the piezoelectric monocrystal layer so that, for any pair of biosensor units that are next to one another in the assembly, at least one of the Bragg solid bulk structures is located between both biosensor units of the pair and has at least one pattern repetition direction that is oriented from the piezoelectric portion of one of the biosensor units of the pair towards the piezoelectric portion of the other biosensor unit of said pair.

2. The biosensor assembly of claim 1, wherein the Bragg solid bulk structures are further distributed on the piezoelectric monocrystal layer so that each of the piezoelectric portions that is dedicated to one of the biosensor units is surrounded by one or several of the Bragg solid bulk structures.

3. The biosensor assembly of claim 1, wherein each Bragg solid bulk structure that is next to a limit of the piezoelectric portion dedicated to one of the biosensor units has its pattern repetition direction that crosses said limit.

4. The biosensor assembly of claim 3, wherein the pattern repetition direction of each Bragg solid bulk structure that is next to the limit of the piezoelectric portion dedicated to one of the biosensor units is oriented perpendicular to said limit.

5. The biosensor assembly of claim 1, wherein the pattern of each Bragg solid bulk structure is formed by a spatial alternation between at least two media having respective acoustic impedance values that are different from one another.

6. The biosensor assembly of claim 5, wherein one of the media is a gas, in particular air.

7. The biosensor assembly of claim 1, wherein each Bragg solid bulk structure is comprised of a network of separated pillars, separated walls or separated wells, with an extension direction of said pillars, walls or wells, respectively, that is perpendicular to the reference plane.

8. The biosensor assembly of claim 1, wherein a pitch of each solid bulk Bragg structure is comprised between one tenth and one hundredth of a lateral dimension of the piezoelectric portions that are next to said Bragg solid bulk structure, when said lateral dimension is measured parallel to the reference plane.

9. The biosensor assembly of claim 1, wherein the piezoelectric monocrystal layer is a quartz layer, in particular an AT-cut, ST-cut, Y-cut, Z-cut or 36° Y-cut quartz layer, or a lithium niobate layer, in particular a 128° Y-cut or 64° Y-cut lithium niobate layer, or a lithium tantalate layer, in particular a 112° Y-cut or 64° Y-cut lithium tantalate layer.

10. The biosensor assembly of claim 1, wherein at least part of the Bragg solid bulk structures is out of silicon.

11. A method for manufacturing a biosensor assembly that is in accordance with claim 1, said method comprising the following steps:
/1/ providing a first wafer of a piezoelectric monocrystal material and a second wafer of a solid material;
/2/ adhering the first wafer to the second wafer, the first and second wafers being then both parallel to the reference plane;
/3/ determining a thickness of the first wafer;
/4/ forming the electrodes on the first wafer, on a side of said first wafer that is opposite the second wafer; and
/5/ etching the second wafer on a side of said second wafer that is opposite the first wafer, so as to remove selectively portions of said second wafer in zones of the reference plane, thus forming the Bragg solid bulk structures.

12. The method of claim 11, wherein step /2/ comprises depositing an intermediate layer of an adhesion material onto the first and/or second wafer, and applying the first and second wafers against one another with the intermediate layer therebetween.

13. The method of claim 12, wherein the adhesion material is an electrically conducting material, in particular gold.

14. The method of claim 11, wherein step /3/ is performed by polishing the first wafer on the side of said first wafer that is opposite the second wafer.

15. The method of claim 11, further comprising the following step:
/6/ grafting biointerfaces on the first wafer, on portions of said first wafer that are dedicated to different ones of the biosensor units, as said portions are delimited by the Bragg solid bulk structures, on the side of said first wafer that is opposite the second wafer, each biointerface being suitable for fixing identified biological compounds selectively with respect to other compounds.

* * * * *